(12) United States Patent
Besser

(10) Patent No.: US 8,741,501 B2
(45) Date of Patent: Jun. 3, 2014

(54) NANOENGINEERED MEMBRANE-ELECTRODE ASSEMBLY FOR HIGH-TEMPERATURE PROTON EXCHANGE MEMBRANE FUEL CELLS

(75) Inventor: Ronald S. Besser, New Providence, NJ (US)

(73) Assignee: The Trustees of The Stevens Institute of Technology, Hoboken, NJ (US)

(*) Notice: Subject to any disclaimer, the term of this patent is extended or adjusted under 35 U.S.C. 154(b) by 1159 days.

(21) Appl. No.: 12/697,959

(22) Filed: Feb. 1, 2010

(65) Prior Publication Data

US 2010/0196793 A1  Aug. 5, 2010

Related U.S. Application Data

(60) Provisional application No. 61/206,627, filed on Feb. 2, 2009.

(51) Int. Cl.
  *H01M 8/10* (2006.01)
(52) U.S. Cl.
  USPC ............. 429/483; 429/479; 429/38; 429/26
(58) Field of Classification Search
  USPC .................... 429/483, 479, 38, 26
  See application file for complete search history.

(56) References Cited

U.S. PATENT DOCUMENTS

| 6,231,524 | B1* | 5/2001 | Wallace et al. ............ 600/587 |
| 6,946,362 | B2* | 9/2005 | Gore et al. ............ 438/455 |
| 7,714,398 | B2* | 5/2010 | Ben-Barak et al. ............ 257/414 |
| 2006/0035124 | A1* | 2/2006 | Takei ............ 429/26 |
| 2006/0210862 | A1* | 9/2006 | Zeng et al. ............ 429/38 |
| 2010/0056892 | A1* | 3/2010 | Ben-Barak et al. ............ 600/354 |

OTHER PUBLICATIONS

Song et al.; "Numerical optimization study of the catalyst layer of PEM fuel cell cathode", Journal of Power Sources 126, 104-111 (2004).*
K. Karan, "Assessment of transport-limited catalyst utilization for engineering of ultra-low Pt loading polymer electrolyte fuel cell anode", Electrochemistry Communications 9, 747-753 (2007).*
K. Karan, "Structural Modeling of PEMFC Anode", Proceedings of 211th Meeting of the Electrochemical Society, May 6-10, 2007, Chicago, IL.
Zhou, et al.; "Molded, High Surface Area Polymer Electrolyte Membranes from Cured Liquid Precursors"; J. Am. Chem. Soc. 2006, 128, 12963-12972.

* cited by examiner

*Primary Examiner* — Peter D. Mulcahy
*Assistant Examiner* — Henry Hu
(74) *Attorney, Agent, or Firm* — Greenberg Traurig, LLP

(57) ABSTRACT

A membrane electrode assembly for a high-temperature proton-exchange membrane fuel cell includes a nano-engineered polymeric membrane between an anode and a cathode. The membrane is an electrical insulator, but permits that passage of protons through the membrane. The membrane has a plurality of blind pores therein, each blind pore having an electrically-conductive coating along its inner wall that is in electrical contact with the adjacent one of the anode or cathode. The electrically-conductive coating includes a catalyst, such as platinum, for promoting the liberation of a proton and an electron from a chemical molecule, such as hydrogen, and/or for promoting the combination of a proton, an electron and another molecule, such as oxygen, to form yet another molecule, such as water.

17 Claims, 8 Drawing Sheets

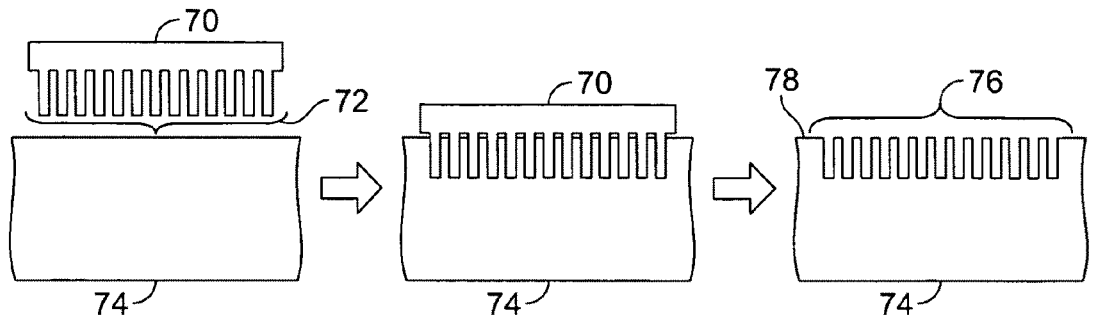
FIG. 5A  FIG. 5B  FIG. 5C
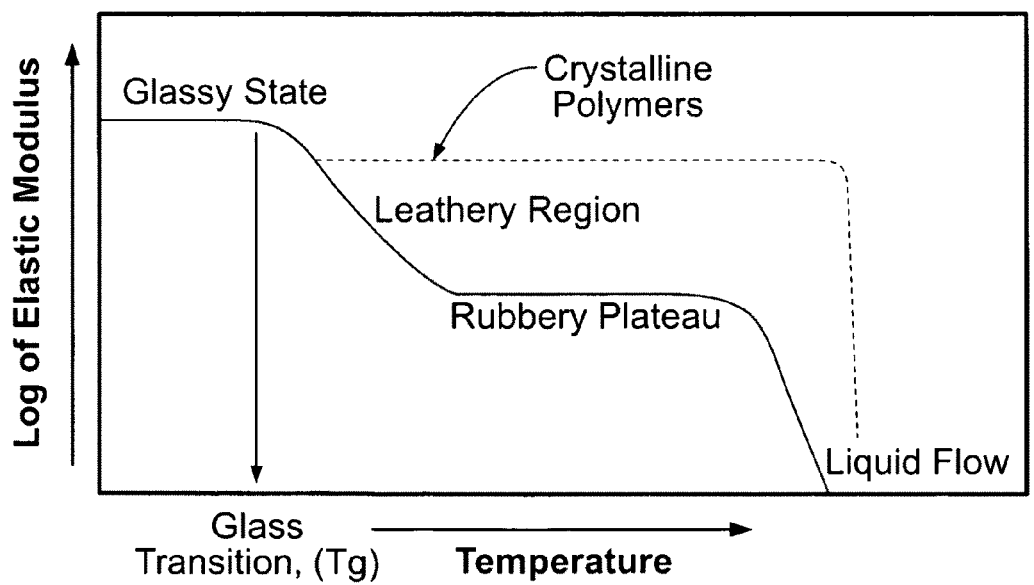
FIG. 6

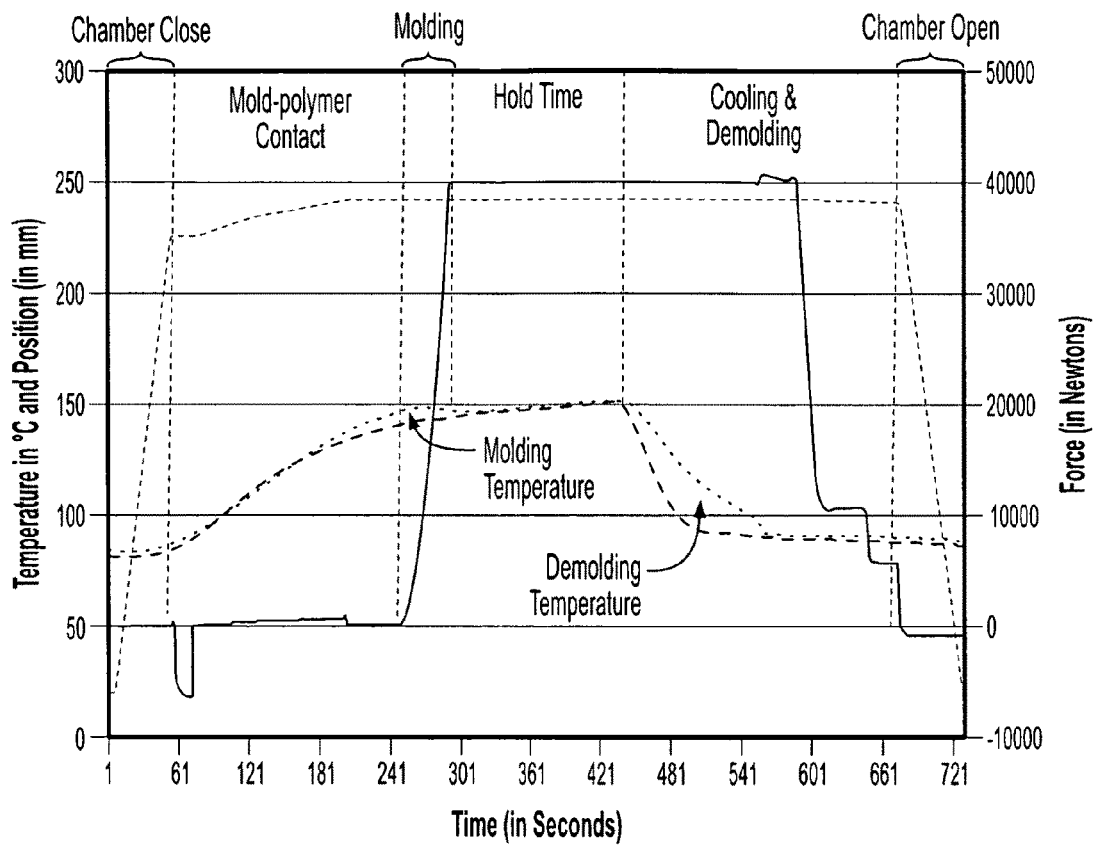
FIG. 7
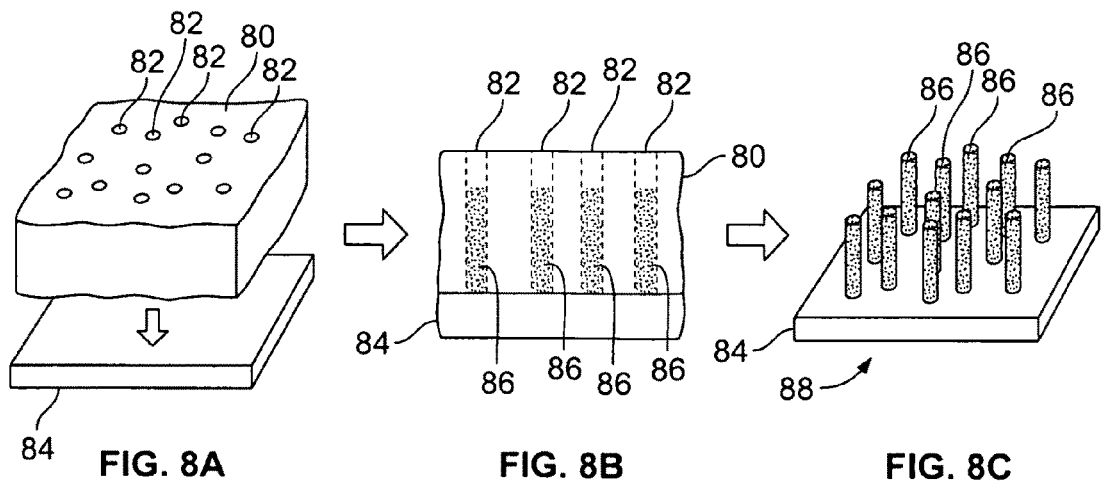
FIG. 8A  FIG. 8B  FIG. 8C

NANOENGINEERED MEMBRANE-ELECTRODE ASSEMBLY FOR HIGH-TEMPERATURE PROTON EXCHANGE MEMBRANE FUEL CELLS

CROSS-REFERENCE TO RELATED APPLICATIONS

This application claims the benefit of U.S. Provisional Patent Application No. 61/206,627, filed on Feb. 2, 2009, the disclosure of which is incorporated by reference herein in its entirety.

FIELD OF THE INVENTION

The present disclosure is relevant to the field of fuel cells, in particular, to high-temperature proton exchange membrane fuel cells.

BACKGROUND OF THE INVENTION

Proton exchange membrane ("PEM") fuel cells are an established fuel cell technology being developed for many applications including transportation (e.g., in automobiles), portable power systems, or stationary systems (e.g., to power a home or building). High-temperature proton exchange membranes ("HTPEM") are an emerging technology that allows a fuel cell to run at temperatures above 100° C., thus, among other benefits, providing improved tolerance of carbon monoxide and reducing the likelihood that water generated by chemical reactions in the fuel cell will collect in porous layers of the device.

FIG. 1 is a schematic representation of a typical HTPEM fuel cell 10, and FIG. 2 is an expanded detail thereof. The HTPEM fuel cell 10 includes a membrane electrode assembly (MEA) 12 that includes a central membrane 14, an anode 16 and a cathode 18. The central membrane 14, typically made of a polymeric material, allows passage of protons ($H^+$) between the anode 16 and cathode 18 (i.e., it permits a proton current), but electrically isolates the anode 16 and cathode 18 from each other (i.e., it does not permit an electrical current between the anode 16 and cathode 18). FIG. 2 schematically presents a proton passing through the central membrane 14. One of the materials suitable for use between the anode 14 and cathode 16 of a HTPEM fuel cell is polybenzimidazole (PBI), which is a standard polymeric membrane material that is resistant to the high temperatures at which HTPEM fuel cells operate.

The anode 16 and cathode 18 each comprise respective gas diffusion layers 20, 22, which are porous so as to permit the passage of oxygen ($O_2$, which may be supplied in air) supplied at the cathode-side gas diffusion layer 22 and a proton-donating fuel (in this example, hydrogen ($H_2$)) supplied at the anode-side gas diffusion layer 20. The gas diffusion layers 20, 22 are also electrically conductive so as to permit the flow of electrons (e).

The anode 16 and cathode 18 further comprise catalyst layers 24, 26 (shown in FIG. 2 as comprising metallic platinum sites, such as platinum sites 28, plated on carbon particles, such as carbon particles 30, in a polymer matrix 32) are provided between each of the respective gas diffusion layers 20, 22 and the central membrane 14. The catalyst layers 24, 26 permit passage of protons ($H^+$), and have pores 34 through which oxygen, hydrogen, or other gases can pass. The catalyst layers 24, 26 are in electrical contact with the gas diffusion layers 20, 22 at their interfaces 36, 38. Each catalyst layer 24, 26 is flat, yet it must be of sufficient thickness to present a sufficient number of active catalyst sites (e.g., platinum sites 28) to provide a sufficient electrical current.

At the catalyst layer 24 of the anode 16, hydrogen gas is catalytically converted to protons and electrons. The central membrane 14 allows passage of protons through the central membrane 14 to the cathode-side catalyst layer 26, where they react with oxygen to form water. Since the central membrane 14 is not electrically conductive, electrons do not pass through it, but pass through a external circuit 40 to the cathode 18, where they participate in the reaction between the protons and oxygen. The three species ($O_2$, $e^-$, and $H^+$) must converge on a catalytic site (e.g., a platinum site 28) in order to complete the electrochemical reaction that generates electricity in the fuel cell 10.

As is apparent from FIGS. 1 and 2, and from the foregoing discussion, conventional HTPEM fuel cells, such as HTPEM fuel cell 10, can be considered to be a stack of disparate materials (e.g., gas diffusion layers 20, 22, catalyst layers 24, 26 and central membrane 14) connected by flat, two-dimensional interfaces. Consequently, electron current densities, and, more importantly, proton current densities, are limited, in part, by the bulk properties of the layers and the cross-sectional areas of the interfaces. Diffusion mass transport through the layers is similarly limited. The catalyst layer 26 serves as the location of "triple phase boundaries," or regions in the cathode 18 in which protons passing from the anode 16, oxygen entering from the cathode 18, and electrons from the external circuit 40, must all converge in order to complete the electrochemical reaction. Flow through the catalyst layers 24, 26, hence, must facilitate the transport of all of these species. To the extent that the resistance to these flows can be reduced, improved performance of the HTPEM fuel cell 10 can be achieved.

SUMMARY OF THE INVENTION

In one aspect, some embodiments of the present invention comprise membrane-electrode assembly for use in a fuel cell that includes an anode, a cathode and a nano-engineered polymeric membrane therebetween. The membrane is an electrical insulator, but permits the passage of protons therethrough. The membrane has a plurality of blind pores therein, at least some of which having an electrically-conductive coating arranged along their inner walls so as to allow electrical communication therewith from an external location. In some embodiments, the coating includes a catalyst, such as platinum, for promoting the liberation of a proton and an electron from a chemical molecule, such as hydrogen, and the coating is in electrical communication with either the anode or the cathode. In other embodiments, each of two opposing sides of the membrane has a plurality of such blind pores. In yet other embodiments, the coating in the blind pores at one surface of the membrane includes a catalyst for promoting the liberation of a proton and an electron from a chemical molecule and the coating in the blind pores at the other, opposed side of the membrane includes a catalyst for promoting the combination of a proton, an electron and another molecule, such as oxygen, to form yet another molecule, such as water. For each of the aforesaid embodiments, there are associated embodiments wherein the blind pores have diameters of less than 1000 nm and aspect ratios of at least 10. For each of the aforesaid embodiments, there are associated embodiments wherein the membrane and other components of the membrane-electrode assembly are adapted for use in a high-temperature proton-exchange membrane electrode assembly.

In another aspect, some embodiments of the present invention comprise a fuel cell that includes a membrane-electrode assembly according to one of the aforesaid embodiments of a membrane-electrode assembly. In some embodiments, the fuel cell is adapted for operation at temperatures greater than 150° C. In other embodiments, the fuel cell is adapted for operation at temperatures greater than 400° C.

In yet another aspect, some embodiments of the present invention comprise a nano-engineered polymeric membrane The membrane is an electrical insulator, but permits the passage of protons therethrough. The membrane has a plurality of blind pores therein, at least some of which having an electrically-conductive coating arranged along their inner walls so as to allow electrical communicating therewith from an external location. In some embodiments, the coating includes a catalyst, such as platinum, for promoting the liberation of a proton and an electron from a chemical molecule, such as hydrogen. In other embodiments, each of two opposing sides of the membrane has a plurality of such blind pores. In yet other embodiments, the coating in the blind pores at one surface of the membrane includes a catalyst for promoting the liberation of a proton and an electron from a chemical molecule and the coating in the blind pores at the other, opposed side of the membrane includes a catalyst for promoting the combination of a proton, an electron and another molecule, such as oxygen, to form yet another molecule, such as water. For each of the aforesaid embodiments, there are associated embodiments wherein the blind pores have diameters of less than 1000 nm and aspect ratios of at least 10. For each of the aforesaid embodiments, there are associated embodiments wherein the membrane material is selected to provide a membrane that is structurally stable, electrically-insulating and permissive to the flow of protons at temperatures of at least 150° C. and/or at temperatures of at least 400° C.

In a further aspect, some embodiments of the present invention comprise a method for making a nano-engineered polymeric membrane, including the steps of forming blind pores in a polymeric membrane and coating the inner walls of the blind pores with an electrically-conductive coating. In some of said embodiments, the step of forming the blind pores includes pressing a heated template against the polymeric membrane at a temperature near the glass transition temperature of the polymer, then removing the template. In some such embodiments, the template includes a plurality of substantially-aligned whiskers extending from a substrate, wherein some of the whiskers have diameters of less than 1000 nm. In some embodiments, the step of coating the inner walls of the blind pores is performed using a method of atomic layer deposition. In other embodiments, the step of coating the inner walls of the blind pores is performed using a method of physical vapor deposition, such as ionized physical vapor deposition.

BRIEF DESCRIPTION OF FIGURES

For a better understanding of the present invention, reference is made to the following detailed description of the exemplary embodiments considered in conjunction with the accompanying drawings, in which:

FIGS. 5A-5C are a sequenced set of diagrams illustrating steps in the formation of pores in a membrane by a hot embossing process according to a method of the present invention;

FIG. 6 is a graph showing changes in the elastic modulus of a polymeric substrate in response to changes in temperature;

FIG. 7 is a graph showing changes in the parameters of a hot embossing process over time;

FIGS. 8A-8C are a sequenced set of diagrams illustrating steps in the formation of a die for forming pores in a membrane by the hot embossing process of FIG. 5;

DETAILED DESCRIPTION OF THE INVENTION

Figure 1:
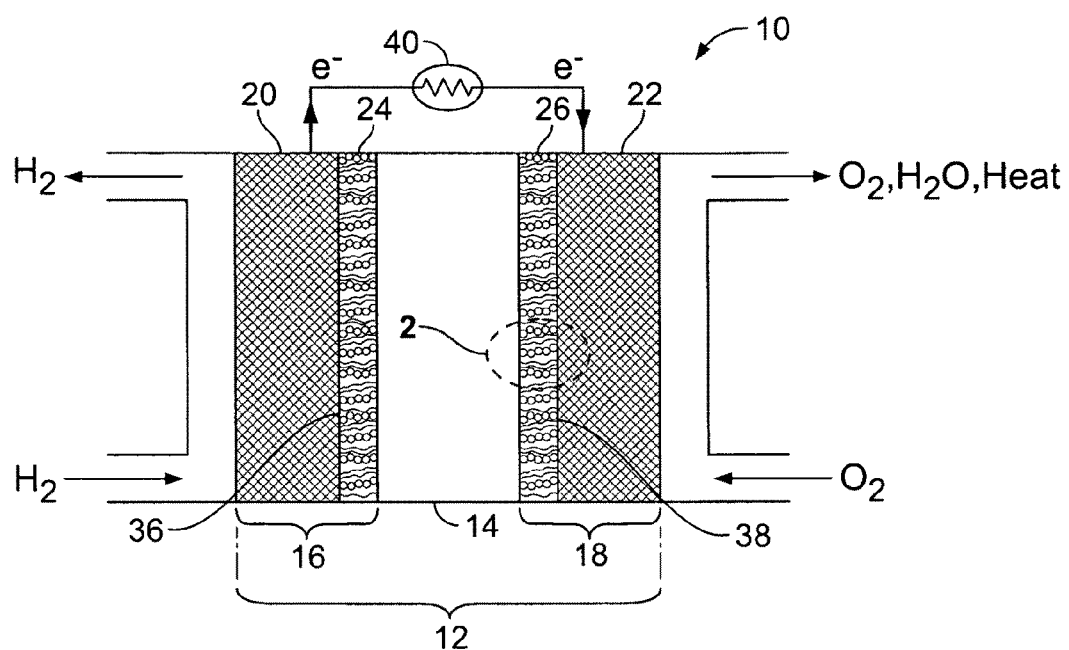
FIG. 1 is a schematic diagram of a membrane electrode assembly (MEA) in a conventional HTPEM fuel cell.
Figure 2:
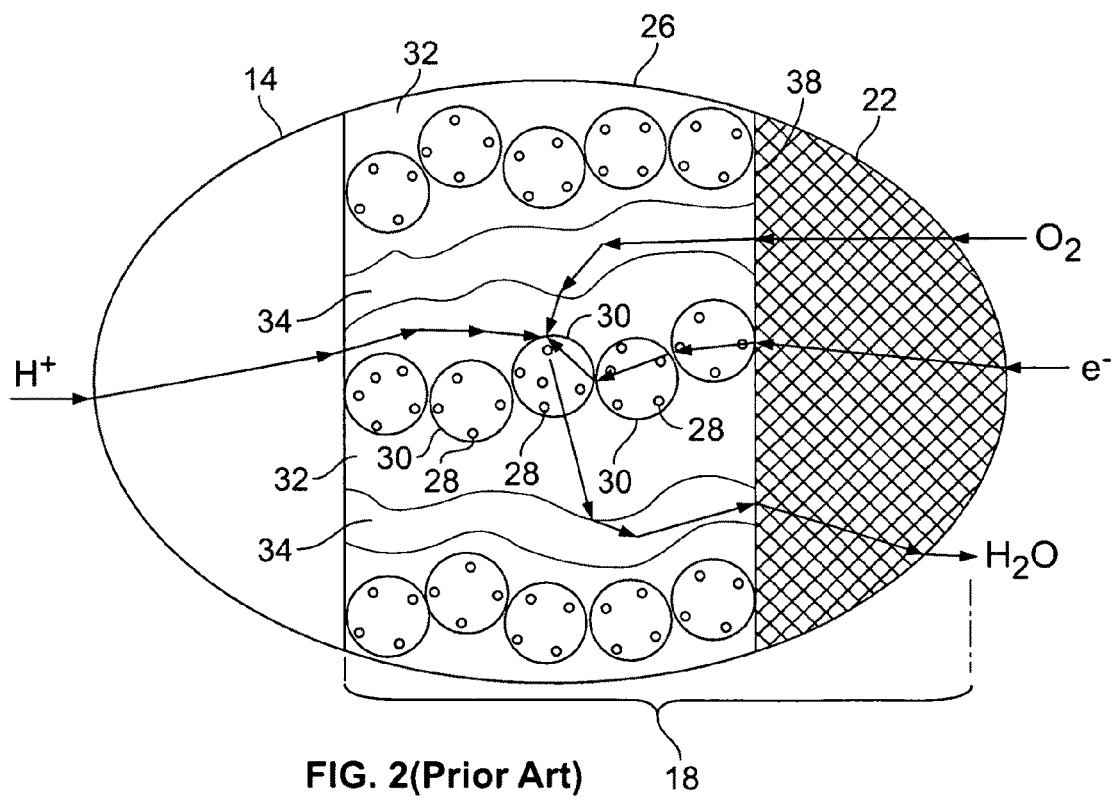
FIG. 2 is a detail of the cathode side of the MEA of FIG. 1.
Figure 3:
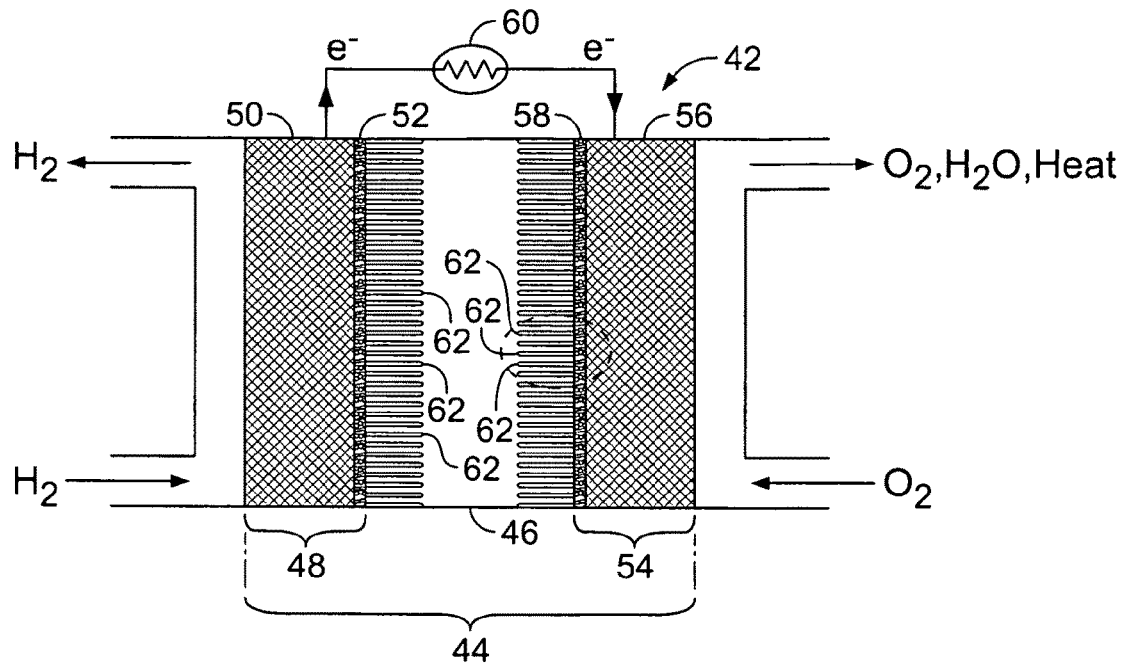
FIG. 3 is a schematic diagram of a MEA having a nano-engineered membrane according to an embodiment of the present invention.
Figure 4:
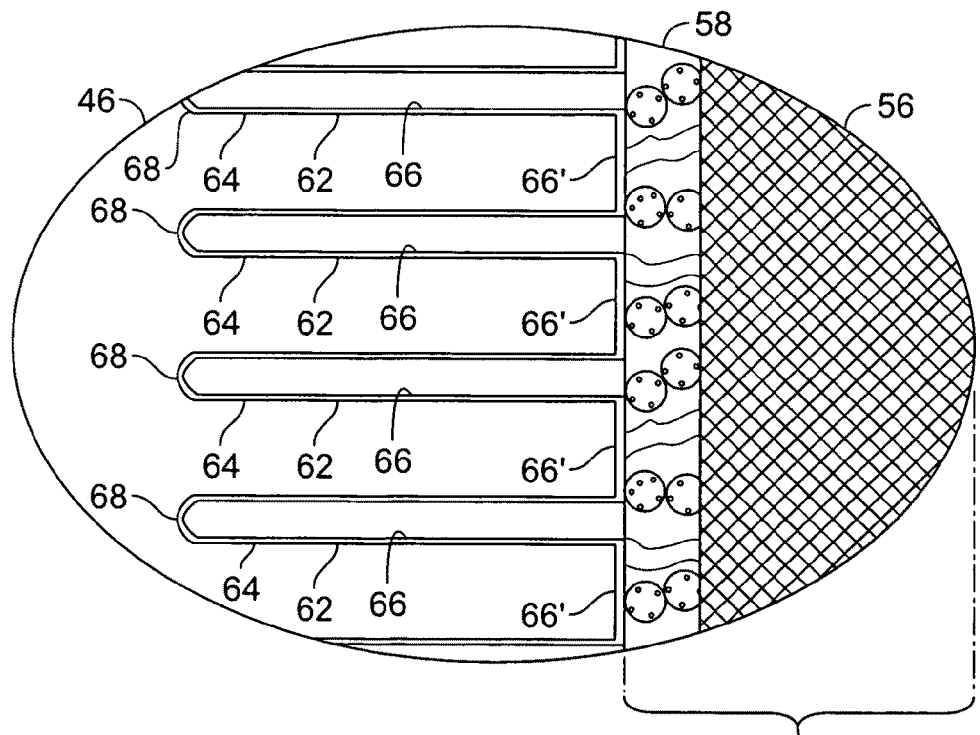
FIG. 4 is a detail of the cathode side of the MEA of FIG. 3, showing features of the nano-engineered membrane.

FIG. 3 is a schematic representation of a HTPEM fuel cell 42 having a nano-engineered MEA 44 according to an embodiment of the present invention, and FIG. 4 is an expanded detail thereof. The MEA 44 comprises a central membrane 46, an anode 48 having a gas diffusion layer 50 and a catalyst layer 52 and a cathode 54 having a gas diffusion layer 56 and a catalyst layer 58. The HTPEM fuel cell 42 may also be provided with a external circuit 60. All of the aforementioned elements of the HTPEM fuel cell 42 may have the same compositions, structures and functions of the similarly named and positioned elements of the HTPEM fuel cell 10 of FIGS. 1 and 2, except as further defined herein.

FIGS. 3 and 4 show three-dimensional features of an embodiment of the nano-engineered MEA 44 of the present invention. The three-dimensional nano-engineered central membrane 46 has an array of nanopores 62, each nanopore having an internal wall 64 which is lined with a catalyst coating 66 (e.g., platinum (Pt)). The catalyst coating 66 extends outside of the nanopore 62 at locations 66', such that it may electrically contact the adjacent catalyst layer 58. For the purposes of this specification and the appended claims, the term "nanopore" is used in connection with a hole having a diameter of less than about 1,000 nm, which extends into the central membrane 46 and has a closed end 68 therewithin (i.e., a "blind pore"). In certain embodiments, the invention may encompass membranes having blind pores with diameters of 1000 nm and greater. The term "pore", as used elsewhere herein, will typically designate a pore that extends through an entire layer of material and is open at both ends (e.g., a pore 34 of FIG. 2). For some embodiments of the present invention, it is desirable that the nanopores 62 of the MEA 44 have diameters in the range of about 250 nm to about 500 nm and lengths of about 10 μm to about 15 μm, but the optimum dimensions will vary according to the overall dimensions of the MEA 44, the materials used for the central membrane 46 and catalyst coating 66, the desired performance characteristics of the MEA 44, and other features of the fuel cell 42.

Thus, nanopores 62 having diameters and lengths outside of those ranges may be beneficially employed in some embodiments of the invention.

The nanopores 62 of central membrane 46 increase the interfacial area of the central membrane 46, thus decreasing the effects of transport resistance across the interfaces of the central membrane 46 and the catalyst layers 52, 58. The catalyst coating 66 of the nanopores 62 increases the contact area available to the hydrogen or other proton-donating fuel at the anode 48, allowing the thickness of the catalytic layer 52 to be reduced. The array of nanopores 62 in the central membrane 46, created with tools and processes developed in the field of nanotechnology, may enhance this interfacial area by factors of greater than 100. The higher the densities of nanopores 62 per area of the central membrane 46, the greater the interfacial area that is available. The catalyst layers 52, 58 of the nano-engineered MEA 44 (as opposed to the catalyst coating 66 in the nanopores 62) are similar in composition and structure to conventional catalyst layers (such as the catalyst layers 24, 26 of FIGS. 1 and 2), except that they may be much thinner, as discussed elsewhere herein. For example, in an embodiment of the present invention, the catalyst layers 52, 58 of the nano-engineered MEA 44 are only about one-tenth as thick as conventional catalyst layers, such as catalyst layers 24, 26 of FIGS. 1 and 2. Thus, the total catalyst loading can be substantially reduced while maintaining or exceeding the performance of a conventionally-engineered fuel cell, such as HTPEM fuel cell 10 of FIG. 1. The resulting fuel cells, such as HTPEM fuel cell 42, benefit from reduced catalyst cost and improved performance over conventional HTPEM fuel cells.

Polymers suitable for use as the central membrane 46 in a nano-engineered MEA 44 (e.g., PBI) can be patterned with nanopores 62 by adaptations of methods already known in the art, which include hot embossing, nanoimprinting, and soft lithography. One adaptation of nanoimprinting that is particularly well-suited for fabricating a nano-engineered MEA 44 according to an embodiment of the present invention, is discussed elsewhere herein.

Platinum and platinum-plated carbon are discussed herein as exemplary catalysts. Platinum is known to promote efficient conversion of hydrogen molecules to protons. Other catalysts currently known, or to be developed, may be used in place of, or along with, platinum catalysts, as long as they can facilitate the proton exchange reactions that produce electricity in a HTPEM fuel cell. Such known catalysts include, but are not limited to, platinum, platinum-ruthenium, and platinum-nickel catalysts. Other catalysts that may be used in PEM fuel cells are presently under development, and their utility in embodiments of the present invention will be recognized as the art continues to develop.

The ability to create a thin catalyst coating for the nanopore walls (e.g., catalyst coating 66 of nanopores 62 of FIGS. 3 and 4) is also of particular importance to the performance of the embodiment of the nano-engineered MEA 44 discussed herein. Care must be taken in forming the coating so as not to block the nanopores, which would effectively prevent gas transport, greatly decreasing the efficacy of the extended interfacial area. Care must also be taken to permit transport of protons across the interface of the catalyst and the central membrane. At least two established methods can be used for creating the catalyst coating. The first is atomic layer deposition ("ALD"), a method based on self-terminating surface chemical reactions for film formation. The second is the directional technique known as ionized physical vapor deposition ("i-PVD"), a form of metal deposition which has become standard in the semiconductor industry for depositing a metal film on the walls of high-aspect holes and trenches. Both methods are discussed elsewhere herein.

Features of Three-Dimensional Nano-Engineered MEA

Three-Dimensional Patterning of Membranes

Ionomeric membranes were patterned with microscale depressions having dimensions of about 1-5 μm by soft lithography molding (Zhou, et al., "Molded, High Surface Area Polymer Electrolyte Membranes from Cured Liquid Precursors," Journal of the American Chemical Society 128, 12963-12972 (2006), the disclosure of which is incorporated herein by reference in its entirety). The maximum dimensions achieved were limited by the microfabrication techniques used, but the interfacial surface areas of the patterned areas of the membranes were doubled. With reference to FIGS. 3 and 4 of the present disclosure, the nanopores 62 of the nano-engineered MEA 44 of the present invention, typically have diameters of less than 1000 nm, allowing a dense arrangement of the nanopores 62, and depths of 10 μm or more. Thus, the increase in interfacial area contributed by the nanopores 62 can be many times greater than that of the membranes reported in Zhou et al.

Proton Current Density

In an assessment of a membrane according to an embodiment of the present invention, a finite element model was constructed of a single-pore structure in a small section of PBI membrane to determine the effect of the three-dimensional structure on membrane resistance (i.e., the inverse of membrane conductance). The modeled structure represented a single pore having a closed end, a diameter of 1 μm (i.e., 1000 nm) and a depth of 10 μm. Due to the symmetric geometry of the pore, the computational domain consisted of half of the membrane with cylindrical symmetry applied. The highest proton current density around the modeled pore occurred at the closed end of the pore. For a modeled pore having a diameter of 500 nm, increasing pore depth from 0 to 15 μm improved conductance by factors as great as 2.4. This model is simplistic in that it solves for current flow through a material of defined shape and ionic conductance with fixed voltage at the boundaries. The model simply represents the membrane and includes no mass transport external to the membrane or reaction kinetic effects. However, it strongly indicates an immediate benefit of the incorporation of a nanostructured three-dimensional interface in terms of improved conductance.

Catalyst Layer Thinning

Increasing the interfacial area between the catalyst layer and the central membrane allows the use of thinner catalyst layers while maintaining the same catalyst loading (i.e., related to the number of catalytic sites), or while decreasing the catalyst loading. As discussed below, it has been shown that reducing catalyst layer thickness in conventional, low-temperature fuel cells can lead to improved fuel cell performance. The embodiments of a nano-engineered HTPEM fuel cell, such as HTPEM fuel cell 42 of FIG. 3, would, therefore, provide substantial improvements in performance over a conventional PEM having flat interfacial surfaces. The relationship between catalyst loading, catalyst layer thickness and electrical current density is demonstrated by the two studies summarized below.

A detailed kinetic and mass-transport model was developed to perform a numerical optimization study of the critical MEA cathode parameters, including catalyst layer thickness, catalyst loading, and others (e.g., ionomer content and void fraction) (Song, et al., "Numerical optimization study of the catalyst layer of PEM fuel cell cathode," J. Power Sources 126, 104-111 (2004), the disclosure of which is incorporated by reference herein in its entirety). For a two-parameter optimization of catalyst layer thickness and loading, it was observed that, for a constant catalyst loading, electrical current density increased dramatically as catalyst thickness decreased, up to a maximum current density, after which the current density dropped precipitously. For constant catalyst thicknesses, increasing catalyst loading had only a slight effect on current density. The tradeoff between catalyst loading and layer thickness can be expressed as follows: electrical current density increases with catalyst loading (reflecting increases in the number of active catalytic sites) and decreases with catalyst layer thickness (reflecting limits on diffusion). Although this simulation was specific to a conventional, low-temperature Nafion®-PEM fuel cell rather than a high-temperature PBI-HTPEM fuel cell, it may be seen that (1) at a given catalyst loading, the use of thinner catalyst layers provides significant benefits, and (2) higher current densities may be achieved at lower catalyst loading by using thinner catalyst layers.

In other studies (K. Karan, "Assessment of transport-limited catalyst utilization for engineering of ultra-low Pt loading polymer electrolyte fuel cell anode," Electrochem. Comm. 9, 747-753 (2007), and K. Karan, Proceedings of 211th Meeting of the Electrochemical Society, May 6-10, 2007, Chicago, Ill., The Electrochemical Society, Pennington, N.J. (2007), both of which are incorporated herein by reference in their entireties) a numerical study of anode catalyst utilization in conventional low-temperature PEM fuel cells was performed using an agglomerate model. It was shown that a significant fraction of the anode catalyst layer was inactive and contributed to polarization loss by introduction of mass transport resistance. This suggests that, for typical PEM anode parameters, a significant fraction of the catalyst layer is unnecessary and could be eliminated without diminishing performance. It was also shown that, for the PEM anode, reduction in thickness did not simply preserve performance. Rather, a thinner anode catalyst layer, even at reduced catalyst loading, led to an increase in power density.

Forming Nanopores with Nanoimprint Lithography

Nanoimprint lithography (NIL) may be beneficially employed to generate a three-dimensional pattern in a membrane according to an embodiment of the present invention. FIGS. 5A-5C represent a schematic illustration of an NIL process as it may be applied in an embodiment of the present invention. A heated die 70 having a patterned surface 72 is pressed against a surface of a polymer membrane 74 at an elevated temperature, such as a temperature near the glass-transition temperature ($T_g$) of the polymer. The die 70 is then withdrawn, leaving a pattern 76 on the surface 78 of the membrane 74 that is the inverse of the imprinted patterned surface 72 of the die 70. The entire process is rapid, permits control over the depth of the imprinted pattern 76, and could be adapted to high-volume manufacturing.

The aforementioned conditions derive from the viscoelastic thermal response of thermoplastic polymers as illustrated in FIG. 6. Near the glass-transition temperature of the polymer (e.g., 400 to 425° C. for PBI), the elastic modulus of the polymer drops precipitously with increased temperature. At slightly higher temperatures, the polymer may be subjected to forces that result in viscous flow of the material, permitting formation of a pattern in the polymer. The NIL process therefore depends not only on temperature, but also on heating rates and strain rates. This is illustrated in FIG. 7 showing an applied force and temperature vs. time plot from an NIL process carried out on a polycarbonate sample. Thus, it is important that the NIL system (sometimes referred to as a "hot embossing system") used to imprint the central membrane 46 of the nano-engineered MEA 44 has the ability to control the temperature, force, application rates and other parameters of the NIL process for the particular polymer that is to be used.

In an embodiment of a process for making a nano-engineered HTPEM fuel cell according to the present invention, it is important to prepare a die with the appropriate nanoscale geometry to be replicated in the central membrane 46. While such a die may be used repeatedly, it must first be constructed with the desired geometry and pattern. To create a die suitable for forming nanopores in a membrane, such as nanopores 62 in central membrane 46 of FIGS. 3 and 4, a procedure such as that illustrated in FIGS. 8A-8C may be performed. A template 80 having columnar pores, such as pores 82, that approximate the diameter of the desired nanopores 62 is attached to a metal substrate 84, such as a piece of flat-machined nickel. Examples of templates having suitable characteristics include certain nanoporous filtration membranes, such as those described below. After passivating the substrate 84, a conventional electroplating process may be used to form metal whiskers, such as metal whiskers 86 (hereinafter, "nanowhiskers"), in the pores 82 of the template 80. The template 80 is etched away, leaving a die 88 in the form of a "bed of nails", where each "nail" is a nanowhisker 86 affixed to the substrate 84 and replicating the dimensions of the columnar pores 82 of the template 80. The die 88 is then mounted to the head of a hot embossing system (not shown) and used to form the inverse of the nanowhiskers 86 in the ionomer membrane, such as membrane 74 of FIG. 5C. Although the specific procedure illustrated in FIG. 8A-8C is directed to the formation of nanowhiskers in templates having columnar pores, it will be understood that other templates having pores of other shapes, relative dimensions, and density of pores may be prepared by known methods and used to form dies that will produce the desired impressions in an ionomer membrane.

Figure 9:
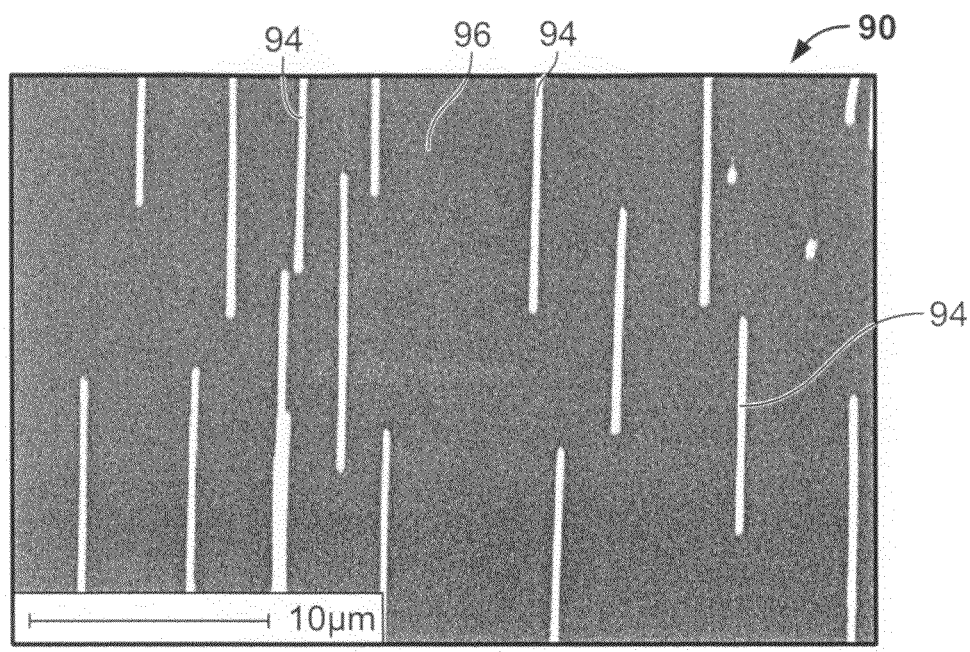
FIG. 9 is an SEM image of a die formed according to the steps of FIG. 8.
Figure 10:
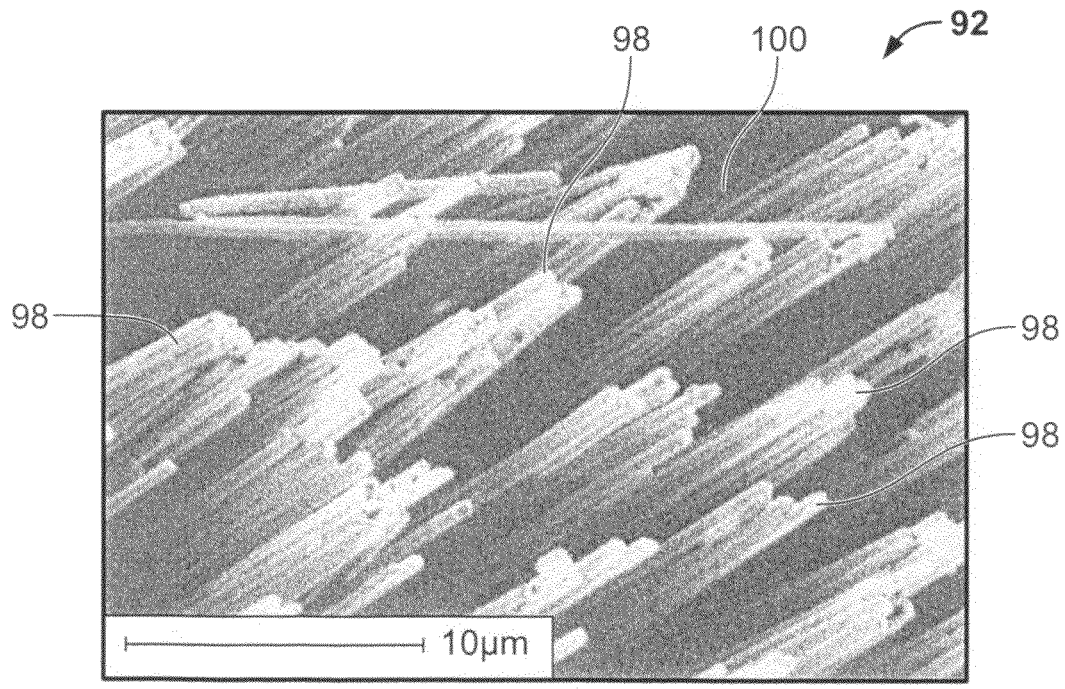
FIG. 10 is an SEM image of another die formed according to the steps of FIG. 8.

FIGS. 9 and 10 are micrographs of dies 90, 92 produced from copper by a process such as that described above. FIG. 9 shows nanowhiskers, such as nanowhiskers 94, made at low density and extending from a substrate 96. The nanowhiskers 94 illustrate the high aspect ratios that may be obtained. The nanowhiskers 94 have thicknesses of about 0.3 µm (i.e., 300 nm) and lengths of about 30 µm, and, thus, aspect ratios of about 100. FIG. 10 shows nanowhiskers 98 extending from a substrate 100. Nanowhiskers 98 were produced at a higher whisker density than that of nanowhiskers 94 and have aspect ratios of about 60. High aspect ratios, such as those of nanowhiskers 94, 98, are not necessary to produce useful performance characteristics in the MEA according to the present invention. Nanowhiskers having aspect ratios of about 10 may be used with beneficial results. Further, nanowhiskers may be made of metals other than copper. For example, nanowhiskers made of nickel-iron will maintain more stiffness than copper nanowhiskers in temperature ranges greater than 400° C., which encompasses the glass-transition temperatures of a number of polymers (e.g. PBI) that are useful in the present invention.

Figure 11:
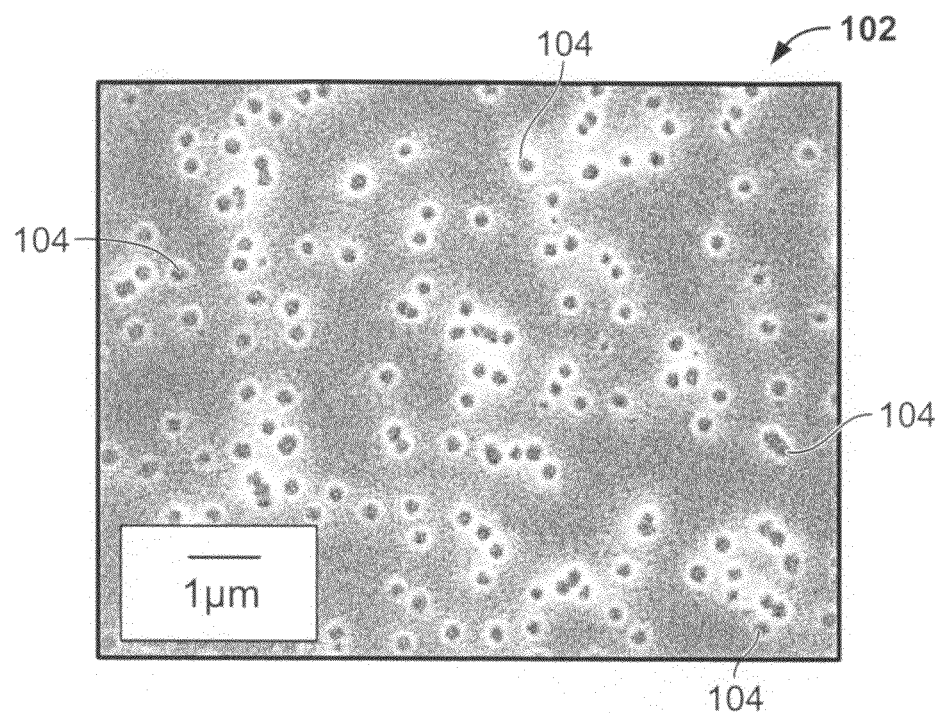
FIG. 11 is an SEM image of a porous filter membrane useful as a template for forming a die according to the steps of FIG. 8.
Figure 12:
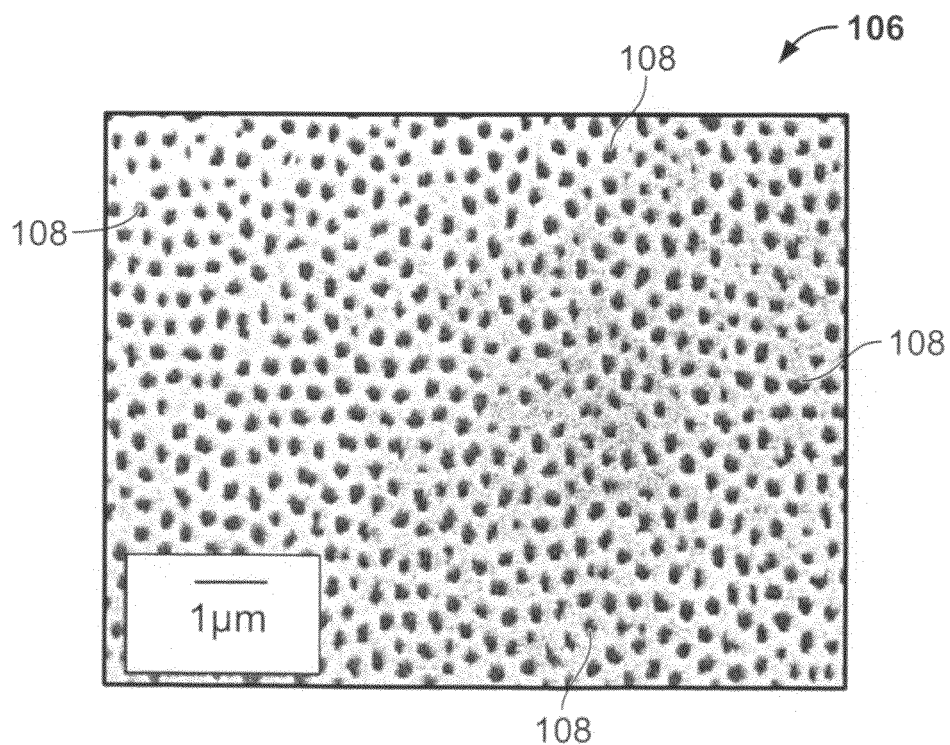
FIG. 12 is an SEM image of another porous filter membrane useful as a template for forming a die according to the steps of FIG. 8.

Suitable porous filter media for use in forming nanowhiskers include those such as the Nuclepore® and Anopore® membranes (Whatman, Inc., Maidstone, Kent, UK). The aforementioned filter media comprise membranes of either ion-track etched polymer or anodic aluminum oxide with highly uniform nano to microscale pores (i.e., from about 10 nm to about 20 µm) penetrating the membrane. FIG. 11 is a SEM image of a Nucleopore® membrane 102 (polycarbonate) having pores such as pores 104, and FIG. 12 is a SEM image of an Anopore® membrane 106 (aluminum oxide) having pores such as pores 108.

Forming Nanoporous Membranes with Solvent Casting

Besides being used to imprint pores into membranes, nanowhisker dies may be used as molding masters for solvent casting raw polymers into membranes having nanopores. In a solvent casting process, a raw polymer is dissolved in a solvent and the solution is deposited onto the die. The solvent evaporates, leaving behind a polymer membrane having the inverse imprint of the nanowhiskers (i.e., nanopores) of the die. PBI material, for example, is available as high purity raw polymer, which is able to be solvent cast into high quality HTPEM membranes.

Coating Nanopores with Atomic Layer Deposition

Figure 13:
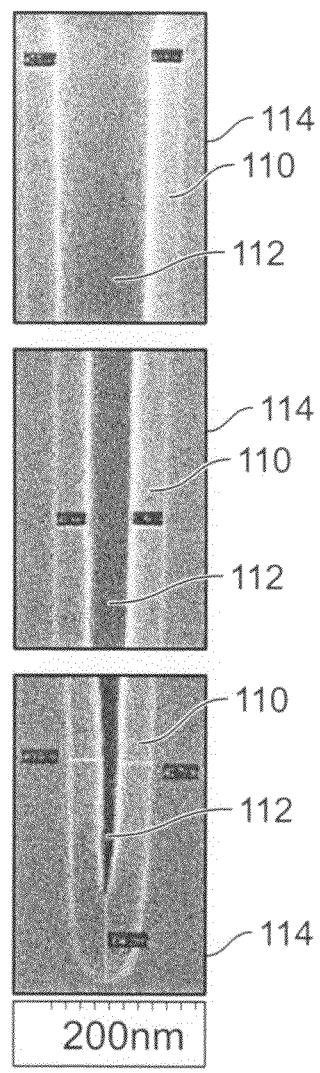
FIG. 13 is a segmented SEM image of a trench in a silicon substrate having an inner surface coated with metal according to a method of the present invention.

Atomic layer deposition ("ALD") is a surface-controlled thin-film manufacturing process allowing the formation of atomically-controlled surfaces. It is based on the saturation of individual, sequentially-performed surface reactions between the substrate and each of the reactants needed. The saturation mechanism of sequenced ALD results in inherent conformal coating characteristics, thickness uniformity, and homogeneity of the films thus produced. The ability to conformally coat high-aspect-ratio pores is illustrated by FIG. 13, which presents segments (top, middle and bottom) of an SEM image of an ALD film 110 of uniform thickness coating a trench 112 in a silicon wafer 114. The trench 112 has a nominal width of roughly 200 nm and an aspect ratio of about 100. ALD has been used to deposit platinum for a number of applications including catalysts and layers in solid-oxide fuel cells. Metals such as platinum can be effectively deposited on substrates having a temperature of about 270° C., which is compatible with the glass-transition temperature of PBI membranes (i.e., about 425° C.). Catalysts comprising more than one element can also be deposited on the surface of a nanopore by sequential ALD operations.

Coating Nanopores with Ionized Physical Vapor Deposition

Physical vapor deposition of thin films by sputtering has been in common usage for decades. Sputtering is a relatively violent, atomic-scale process in which an energetic particle strikes a solid, resulting in the emission of one or more substrate atoms from the solid. On a macroscopic scale, sputtering is a nearly isotropic deposition process when used at short-throw distances with a wide-area cathode source. However, on an atomic scale, the sputtered atoms tend to travel in straight lines without in-flight collisions from the cathode to the sample at the pressures most commonly used. Since the sputtered atoms are virtually all neutral (i.e., not electrically charged), it is not possible to redirect their trajectories in flight.

A method for enhancing the net directionality of a metallic deposit is to ionize the majority of the sputtered atoms and form the film from metal ions (i-PVD). If the acceleration potential for the ions is significantly greater than their thermal energy, the ions will arrive at the wafer surface at angles of almost exactly 90° with a controllable energy. If a high percentage of the metal flux is ionized, deposition will be primarily directional and the utilization of the sputtered atoms from the cathode will be high.

In the late 1980s and early 1990s, sputtering deposition systems were specifically fabricated to optimize the relative ionization of metal particles prior to deposition. Early systems used electron cyclotron resonance (ECR) and were based on either sputtering or evaporation. Another primary direction has been the use of dense, inductively-coupled plasmas in conjunction with a metal-sputtering source. This latter technique has proven to be the most robust for semiconductor manufacturing applications.

Figure 14:
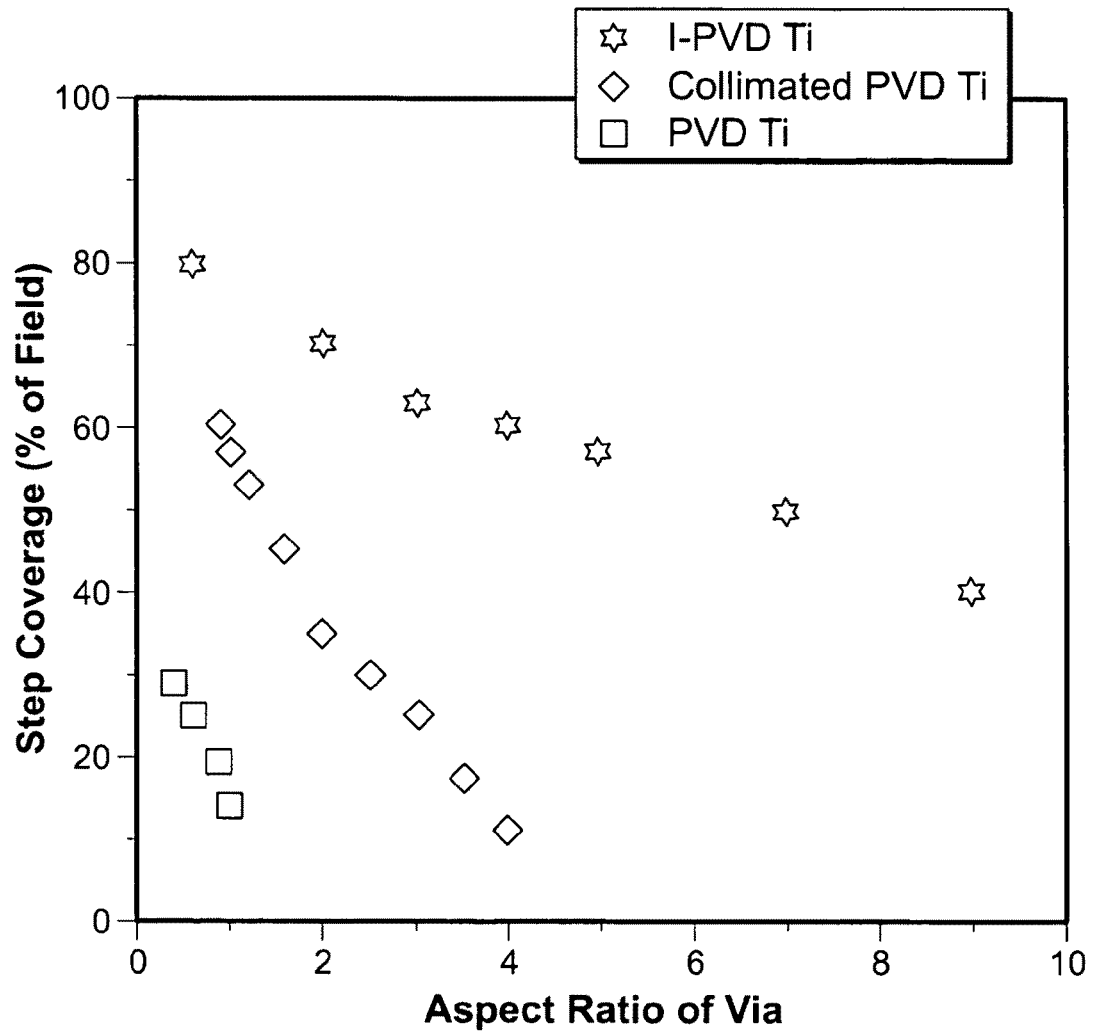
FIG. 14 is a plot of metallic film deposition on a substrate according to a method of the present invention.

The effectiveness of i-PVD relative to other sputtering approaches for depositing titanium (Ti) into a pore is shown in FIG. 14. In the figure, step coverage refers to the thickness of the film in the pore divided by the thickness in the "field" or the horizontal substrate surface. At an aspect ratio of about 10, which may be beneficially used in embodiments of the present invention, step coverage is about 40 percent, which may be useful in many practical applications of membranes having three-dimensional interfaces. Metals other than titanium (e.g., platinum) can also be deposited onto substrates by i-PVD. The attractiveness of i-PVD use in embodiments of the present invention arises from the manufacturing maturity and existing infrastructure for this technology due to its broad deployment in the semiconductor industry. It will be understood by those having ordinary skill in the relevant arts that i-PVD can be performed in conventional sputtering systems with only minor modifications to provide ionization of gas phase species after they have been sputtered from the target.

It should be understood that the embodiments described herein are merely exemplary and that a person skilled in the art may make many variations and modifications thereto without departing from the spirit and scope of the present invention. All such variations and modifications, including those discussed above, are intended to be included within the scope of the invention, which is described, in part, in the claims presented below.

I claim:

1. A polymeric membrane for facilitating electrochemical reactions with or without a catalyst layer adjacent to said membrane, comprising a first membrane surface, a second membrane surface opposite said first membrane surface, and a first plurality of first blind pores in said polymeric membrane, each first blind pore of said first plurality of first blind pores having a first open end adjacent said first membrane surface, a first closed end opposite said first open end, and a first internal side wall extending from said first open end to said first closed end, each first blind pore of said first plurality of first blind pores extending from said first membrane surface toward said second membrane surface, at least some first blind pores of said first plurality of first blind pores having a first electrically-conductive coating provided on said first internal side walls thereof, wherein each of said first internal side walls of said first plurality of first blind pores has a first internal side wall surface area, said first membrane surface has a first membrane surface area exclusive of said first internal side wall surface areas, and the sum of said first internal side wall surface areas is at least 100 times greater than said first membrane surface area.

2. The polymeric membrane of claim 1, wherein said polymeric membrane is electrically insulating and permissive to the flow of protons.

3. The polymeric membrane of claim 2, wherein said first electrically-conductive coating includes a catalyst having properties for promoting the liberation of a proton and an electron from a chemical molecule.

4. The polymeric membrane of claim 1, wherein said membrane has a second plurality of second blind pores in said polymeric membrane, each second blind pore of said second plurality of second blind pores having a second open end adjacent said second membrane surface, a second closed end opposite said second open end, and a second internal side wall extending from said second open end to said second closed end, each second blind pore of said second plurality of second blind pores extending from said second membrane surface toward said first membrane surface, and at least some second blind pores of said second plurality of second blind pores have a second electrically-conductive coating provided on said second internal side walls thereof, wherein each of said second internal side walls of said second plurality of second blind pores has a second internal side wall surface area, said second membrane surface has a second membrane surface area exclusive of said second internal wall side surface areas, and the sum of said second internal side wall surface areas is at least 100 times greater than said second membrane surface area.

5. The polymeric membrane of claim 4, wherein said polymeric membrane is electrically insulating and permissive to the flow of protons.

6. The polymeric membrane of claim 5, wherein said first electrically-conductive coating includes a first catalyst having properties for promoting the liberation of a proton and an electron from a chemical molecule.

7. The polymeric membrane of claim 6, wherein said second electrically-conductive coating includes a second catalyst having properties for promoting the formation of water from oxygen, protons, and electrons.

8. The polymeric membrane of claim 4, wherein at least some of said first plurality of first blind pores have a nominal diameter of less than 1000 nm and an aspect ratio of at least 10 and at least some of said second plurality of second blind pores have a nominal diameter of less than 1000 nm and an aspect ratio of at least 10.

9. The membrane of claim 4, wherein said second electrically-conductive coating is deposited on said second internal side walls of said at least some second blind pores by controlled deposition of said second electrically-conductive coating onto said second internal side walls of said at least some second blind pores.

10. The polymeric membrane of claim 1, wherein said polymeric membrane is structurally stable, electrically-insulating, and permissive to the flow of protons at temperatures of at least 150° C.

11. The polymeric membrane of claim 1, wherein said polymeric membrane is structurally stable, electrically-insulating, and permissive to the flow of protons at temperatures of at least 400° C.

12. The polymeric membrane of claim 1, wherein at least some of said first plurality of first blind pores have a nominal diameter of less than 1000 nm and an aspect ratio of at least 10.

13. The polymeric membrane of claim 1, wherein said first electrically-conductive coating extends outside of said at least some of said blind pores.

14. The polymeric membrane of claim 1, wherein said first electrically-conductive coating is provided on said first internal side walls of said at least some first blind pores so as to allow electrical communication between said first electrically-conductive coating and an electrical conductor outside of said blind pore.

15. The membrane of claim 1, wherein said first electrically-conductive coating is deposited on said first internal side walls of said at least some first blind pores by controlled deposition of said first electrically-conductive coating onto said first internal side walls of said at least some first blind pores.

16. The membrane of claim 1, wherein said blind pores are formed in said membrane by nanoimprint lithography.

17. The membrane of claim 1, wherein said blind pores are formed in said membrane by three-dimensional patterning.

* * * * *